United States Patent [19]

Fourrey et al.

[11] Patent Number: 4,470,633
[45] Date of Patent: Sep. 11, 1984

[54] INCLINABLE BACKREST PIVOT ROD AND AN INCLINATION ADJUSTING SYSTEM COMPRISING SUCH A ROD

[75] Inventors: Francois Fourrey, Montbeliard; Jean-Francois Mauffrey, Andelnans, both of France

[73] Assignee: Cycles Peugeot, Valentigney, France

[21] Appl. No.: 486,636

[22] Filed: Apr. 20, 1983

[51] Int. Cl.³ .................... H47C 1/024; G05G 1/12
[52] U.S. Cl. ........................ 297/362; 16/DIG. 24; 74/548; 403/259; 403/361
[58] Field of Search ............ 297/362; 74/548; 403/383, 361; 16/DIG. 24

[56] References Cited

U.S. PATENT DOCUMENTS

| | | | |
|---|---|---|---|
| 2,271,266 | 1/1942 | Kost | 16/DIG. 24 |
| 2,522,991 | 9/1950 | Caserta | 403/261 |
| 3,342,273 | 9/1967 | Crane | 403/383 X |
| 3,401,979 | 9/1968 | Putsch | 297/362 |
| 3,436,107 | 4/1969 | Karden | 403/383 X |
| 3,606,406 | 9/1971 | Walters | 403/261 X |
| 3,673,891 | 7/1972 | Pickles | 297/362 X |
| 3,709,534 | 1/1973 | Coe | 403/383 X |
| 4,366,983 | 1/1983 | Klveting et al. | 297/362 |

FOREIGN PATENT DOCUMENTS

| | | | |
|---|---|---|---|
| 430464 | 3/1971 | Australia. | |
| 503334 | 8/1979 | Australia. | |
| 71011 | 7/1981 | European Pat. Off. | 297/362 |
| 2615789 | 10/1976 | Fed. Rep. of Germany | 297/362 |
| 1114122 | 4/1956 | France | 74/548 |
| 2034923 | 6/1980 | United Kingdom | 297/362 |

Primary Examiner—Victor N. Sakran
Assistant Examiner—Peter R. Brown
Attorney, Agent, or Firm—Sughrue, Mion, Zinn, Macpeak and Seas

[57] ABSTRACT

An adjusting system comprising two pivot device 6 and 7 which are symmetrical and have extending therethrough means defining a stepped central aperture whose dimension increases from the interior of the seat structure to the exterior of the latter. A rod 10 which is extended at each end by a square-sectioned bar 23 is slidably mounted in the apertures of the two pivot devices and is fitted at one end in a sleeve rigid with a control element 30. A locking hairpin element locks the control member to the rod but may be withdrawn at any time so as to permit reversing the direction in which the seat structure is positioned.

3 Claims, 4 Drawing Figures

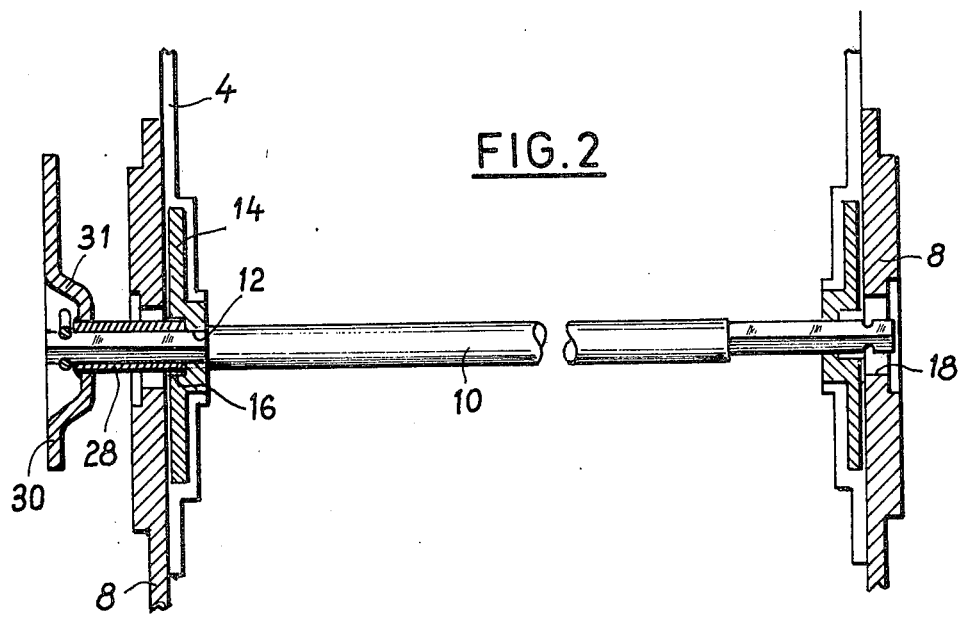
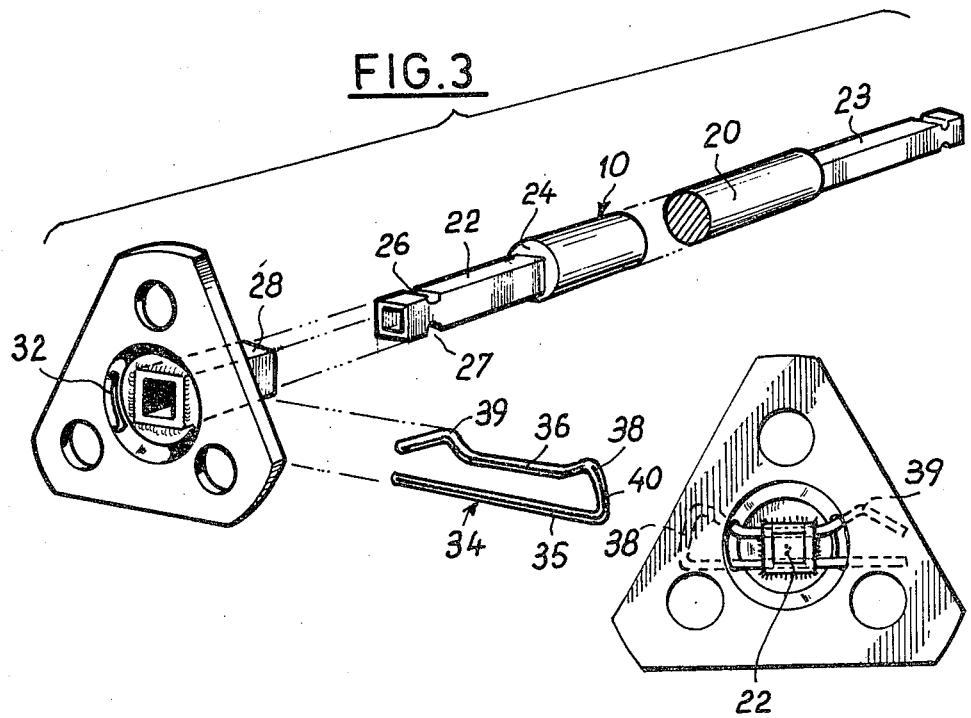

INCLINABLE BACKREST PIVOT ROD AND AN INCLINATION ADJUSTING SYSTEM COMPRISING SUCH A ROD

DESCRIPTION

The present invention relates to seat structures having an inclinable backrest and in particular motor vehicle seat structures.

It is now conventional to provide automobile seat structures with a system for adjusting the inclination of the backrest constituted by two pivot devices mounted between the backrest and the seat proper on each side of the seat structure and interconnected by a rod which on one side, namely on the right or left side of the seat depending on whether the latter is intended for the driver or a passenger of the vehicle, is fixed to an element connected to a handle or other control element.

The construction of a system of this type involves the use of a driving device and a driven device which are arranged differently and the prior determination of the intended position of the seat structure. Consequently, the assembly lines of automobile factories must include a region supplying right seat structures and another supplying left seat structures.

An object of the present invention is to provide an important simplification and to permit the construction of seat structures having an inclinable backrest whose control may be placed, as desired, on the right or left side of the seat structure or even be inverted.

The invention consequently provides a pivot rod for a seat structure which terminates in square-section ends for rigidly interconnecting pivot devices so that they rotate together, each square-section end being carried by an extension bar which includes on at least two opposed sides of the bar, two transverse grooves for receiving a resilient locking hairpin element and is connected to the body of the rod by a radial surface constituting an abutment shoulder.

The rod designed in this way is exactly symmetrical relative to its median transverse plane and can consequently be fixed to a driving element at either of its ends, depending on the intended position of the seat structure.

The invention also concerns a system for adjusting the inclination of the backrest of a seat structure comprising two opposed pivot devices which are connected to rotate together by a pivot rod, in which the two devices are symmetrical and have extending therethrough a central aperture and are interconnected by a rod which is laterally offset so that the extension bar of one of the ends of the rod is merely fitted in the central aperture of one of the pivot devices while the other bar projects out of the second pivot device and is fitted in a control element through which extends a locking hairpin element fixed in the grooves of the bar.

According to a preferred embodiment, the control element comprises a sleeve having a square internal section which fits on the extension bar of the rod and is provided with two opposed lateral openings through which branches of the locking hairpin element extend.

As the two pivot devices are identical and are provided with apertures which extend fully therethrough, and the rod is extended by two identical bars, all the seat structures brought to the assembly line can be similar and constitute either a right seat structure or a left seat structure, depending on the position given to the rod and to the control handle. The choice of the side on which the control element is mounted can thus be made not only in the factory when the seat structure is assembled but also at any moment in the assembly line of the seat structure without requiring any modification of the other elements of the seat structure.

The following description of one embodiment which is given merely by way of a non-limiting example and shown in the accompanying drawings, will bring out the advantages and features of the invention.

IN THE DRAWINGS

FIG. 2 is a diagrammatic axial sectional view of the system for adjusting the inclination of the backrest of the seat structure of FIG. 1;

FIG. 3 is an exploded view of the assembly comprising the rod and the shifting element;

FIG. 4 is an elevational view of the shifting element mounted on the rod.

Figure 1:
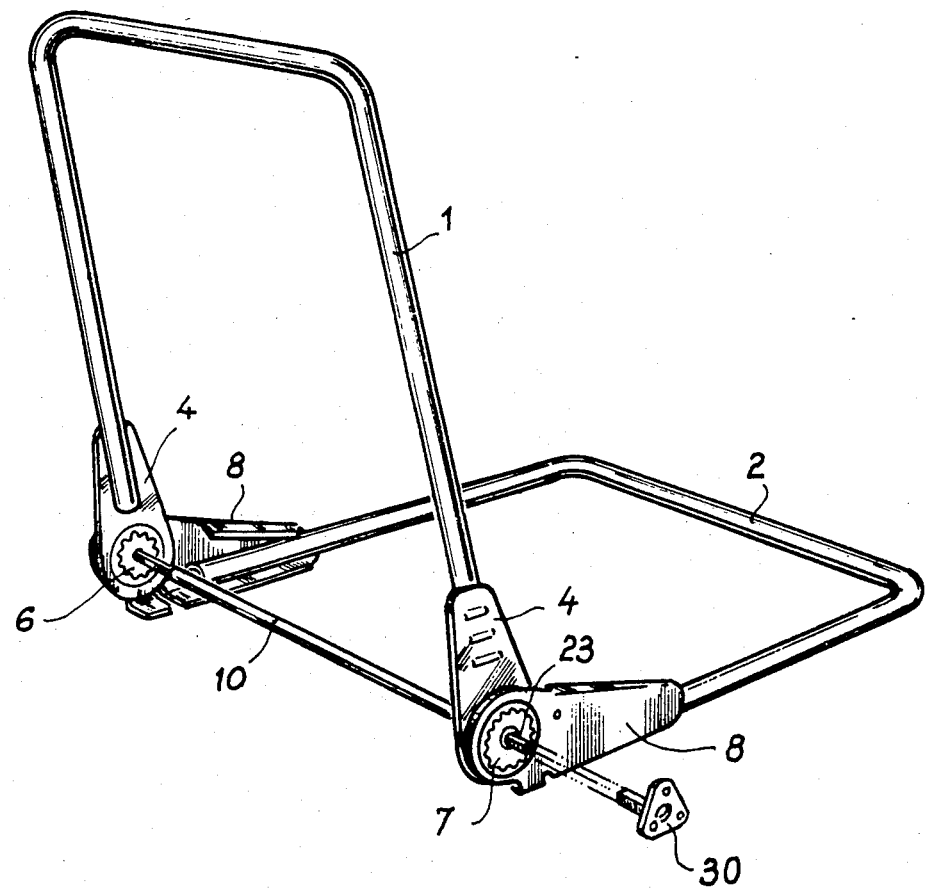
FIG. 1 is a diagrammatic perspective view of a motor vehicle seat structure according to the invention.

In FIG. 1, a motor vehicle seat structure is shown diagrammatically in the form of a backrest frame 1 and a seat frame 2. The frame of the backrest 1 is fixed at each end to a movable arm 4 which is connected by a pivot device 6 and 7 to a fixed arm 8 rigid with the seat frame 2.

The two pivot devices 6 and 7 are rigidly interconnected by a rod 10.

According to the invention, the pivot devices 6 and 7 are identical and symmetrical relative to the median plane of the seat structure. Each one thereof is moreover provided with means defining a stepped aperture which is outwardly divergent from the interior of the seat structure. The smallest part 12 of this aperture is formed in an element 14 rigid with the movable arm 4 (FIG. 2) and is extended in the same element by a slightly larger part 16. In the element 8, an extension 18 of the aperture has an inside dimension which is still larger and communicates with the exterior of the pivot device. At least the apertures 12 and 16 have a non-circular cross-sectional shape which is preferably a square.

The rod 10 interconnecting the two pivot devices comprises, as shown more particular in FIGS. 2 and 3, a body or centre portion 20 of circular cross-sectional shape which is extended by two thinner end portions in the form of bars 22, 23 of square cross-sectional shape connected to the cylindrical part 20 by a radially extending abutment surface 24 constituting an outer shoulder.

Formed adjacent to the free ends of the end portions or bars 22 and 23 are transverse aperture means in the form of at least two parallel grooves 26, 27 which extend transversely in the opposed sides of the corresponding bar 22, 23.

When the seat structure is assembled, the rod 10 extended by the bars 22 and 23 is fitted in the narrow centre apertures 12 of the two devices but is offset relative to the latter. One of the bars 23 is merely partly fitted into the aperture 12 (on the right side of FIG. 2) so as to avoid extending outwardly beyond the pivot device and in particular beyond the fixed arm 8 of the latter. On the other hand, the other bar 22 is fully inserted in the successive apertures 12, 16, 18 and outwardly extends beyond the device, the corresponding shoulder 24 bearing against the element 114 of the pivot device.

Fitted on this projecting bar 22 is a sleeve 28 having a square cross-sectional shape and an end which is fitted in the aperture 16 of the element 14. The other end of this sleeve is rigid with a shifting element 30 which, in the illustrated embodiment, is constituted by a rotary handle. Preferably, the handle 30 has a hollow centre boss 31 which projects toward the sleeve 28 and to which this sleeve is fixed and which is provided with two opposed openings 32, each of which is located in the region of a lateral side of the sleeve 28. The branches 35, 36 of a resilient hairpin element 34 are fitted in the openings 32 and engaged in the opposed grooves 26 and 27 of the bar 22 so that they axially fix in position the sleeve and the shifting element relative to the rod and consequently to the element 14.

The two branches 35 and 36 of the hairpin element 34 each have a rectilinear central portion, but whereas the branch 35 is fully rectilinear, the branch 36 is outwardly bent and forms two projections 38 and 39 respectively, one projection being near to the curved portion 40 of the hairpin element and the other near to the free end of the latter.

As shown more particularly in FIG. 4, when the hairpin element 34 is in position, the rectilinear portions are engaged in the grooves 26, 27 and the two projections 38 and 39 lock the hairpin element 34 in the openings 32 and prevent any accidental extraction of the hairpin element, so that the shifting element is rendered strictly rigid with the pivot rod 10 and the extension bars of the rod.

As the bar 23 is exactly identical to the bar 22 and disposed symmetrically relative to the latter, and as moreover the pivot devices are similar and symmetrical, the rod 10 could be without difficulty offset in the opposite direction to that shown in FIG. 2 and project, as shown in FIG. 1, outside the right side of the seat structure. In this case, the shifting element 30 is mounted on the bar 23 and a locking hairpin element 34 holds it stationary on this bar and the bar 22 is merely inserted in the aperture 12 of the other pivot device.

Consequently, in the course of manufacture, the frames of the backrest and seat proper may be both provided with two identical pivot devices and a rod 10 may be slidably mounted between the pivot devices, irrespective of the positions in which the seat structure is intended to be placed. The sliding of the pivot rod 10 and the mounting of the shifting element 30 is then effected on the right or left side of the seat structure, depending on requirements, on the assembly line which receives only a single type of seat structure. This considerably simplifies and accelerates manufacture.

Further, as the hairpin element 34 is resiliently yieldable and is merely fitted in the openings 32 and the grooves 26 and 27, the element 34 can at any time be withdrawn out of the shifting element to permit the disassembly of the shifting element and then put back into position for example on the opposite side, after the rod 10 has been shifted and inserted in the corresponding open aperture 12, 18, if it is desired to reverse the control device of the seat structure for any reason.

There is in this way provided a system which comprises the maximum number of identical parts capable of being mounted in reverse positions, which permits a considerable economy as concerns manufacture and a reduction in the number of different parts stored. The assembly is also considerably simplified.

Having now described our invention what we claim as new and desire to secure by Letters Patent is:

1. A system in combination with a seat structure for adjusting the inclination of a backrest of said seat structure, said system comprising two opposed coaxial pivot devices combined with said backrest and spaced a given distance apart transversely of said seat structure for pivoting said backrest, a pivot rod interconnecting the pivot devices so that the pivot devices are actuatable together in synchronism, said rod having a body portion and two end portions which are coaxial with said body portion and are of equal length and have a non-circular cross-sectional shape, a shoulder being defined between each end portion and said body portion for axially abutting a respective one of said pivot devices, passage means on each end portion, and extending transversely thereto the two pivot devices being identical and symmetrical and each having extending therethrough means defining a central aperture having a non-circular cross-sectional shape, each of said apertures receiving and fitting on a respective one of said end portions of the rod whereby said means defining said central aperture are rotatable together about the axis of said rod upon rotation of said rod, said body portion of the rod having a length less than said given distance to an extent sufficient to allow said rod to be axially shifted in either direction relative to said pivot devices so that either one of said end portions of the rod is merely fitted into said central aperture of the corresponding pivot device substantially without axially projecting beyond said corresponding pivot device, while the other end portion of the rod engages in the central aperture and projects beyond and out of the other pivot device, a control means defining an aperture having a non-circular cross-sectional shape fitted on said projecting end portion, and a locking element extending through said control means and engaging said passage means in said projecting end portion so as to maintain said control means on said projecting end portion, said passage means being located at identical distances from the respective shoulders of the end portions, whereby said control means can be mounted on the opposite end portion by shifting the rod in such manner that the opposite end portion projects beyond and out of the corresponding pivot device.

2. A system according to claim 1, wherein the locking element is a hairpin-shaped element having two branches and the control means defines a sleeve which has a bore having said non-circular cross-sectional shape and fits on the corresponding end portion of the rod, said control means also defining two opposed openings for the passage of said two branches of the locking element, and said passage means comprising two transverse grooves in each end portion of the rod.

3. A system for adjusting the inclination of a backrest of a seat structure, in particular an automobile seat structure, said system comprising two opposed pivot devices and a pivot rod interconnecting the pivot devices so that the pivot devices rotate together and comprising a body portion terminating in square-section ends, each square-section end being defined by a bar which axially extends the body portion of the rod and has on two opposed sides of the bar transverse grooves for receiving a resiliently yieldable locking hairpin element, a radially extending surface constituting an abutment shoulder being interposed between each bar and the body portion of the rod, the two pivot devices being symmetrical and each having extending therethrough means defining a central aperture, said rod being laterally offset relative to the pivot devices so that one of the bars of the rod is merely fitted into the central aperture of the corresponding pivot device, while the other bar projects beyond and out of the other pivot device, a control means defining two opposed openings and a square-sectioned sleeve which is fitted on said projecting bar, the locking hairpin element comprising two branches both extending in a generally parallel direction through said two openings of the control means, one of the branches defining two outwardly extending projections and locking the hairpin element in said openings of the control means, and the two branches of the hairpin element being respectively engaged in said two grooves of said projecting bar.

* * * * *